United States Patent [19]
Hong et al.

[11] 3,778,769
[45] Dec. 11, 1973

[54] SOLID STATE TOUCH CONTROL HAND SET CIRCUIT

[75] Inventors: Jose Cheng Tsuen Hong; Everett Wendell Werts, both of Normal, Ill.

[73] Assignee: General Electric Company, New York, N.Y.

[22] Filed: Apr. 28, 1972

[21] Appl. No.: 248,648

[52] U.S. Cl. ........ 340/147 LP, 250/227, 340/171 R
[51] Int. Cl. .......................... H04q 3/00, G08c 1/00
[58] Field of Search .................... 340/365 R, 171 R, 340/147 LP, 365 C; 317/146; 179/90 K; 307/242, 253, 254; 328/62, 70; 250/213 A, 217 S, 220 R

[56] References Cited

UNITED STATES PATENTS

| | | | |
|---|---|---|---|
| 3,254,313 | 5/1966 | Atkins et al. | 317/146 |
| 3,293,640 | 12/1966 | Chalfin et al. | 340/365 C |
| 3,399,287 | 8/1968 | Euler | 200/159 |
| 3,461,316 | 8/1969 | Action et al. | 307/253 X |
| 3,469,151 | 9/1969 | Newland | 317/137 X |
| 3,562,540 | 2/1971 | Hirsch | 328/70 X |
| 3,660,838 | 5/1972 | Goue et al. | 340/365 C |

*Primary Examiner*—Donald J. Yusko
*Attorney*—Arthur E. Furnier, Jr. et al.

[57] ABSTRACT

A solid state touch sensitive control circuit, adapted for embodiment in accordance with one form thereof in a control unit to selectively provide an output to a desired one of a plurality of loads, including oscillator means connectable to a direct current power supply for generating a continuous high frequency signal for transmission to each of a plurality of control channels, the number of control channels corresponding to at least the number of loads to be controlled, and each of the plurality of control channels including a first and a second transistor with the emitters of the first and second transistors being coupled together, the collector of the first transistor being connected through a diode to the base of the second transistor, the high frequency signal from the oscillator means being applied to the base of the first transistor, a touch sensitive switch means also being connected to the base of the first transistor such that the second transistor which is normally non-conducting is caused to conduct when the touch sensitive switch means is operated thereby providing a power output only to the load associated therewith, and a set of diodes being connected to the collector of the first transistor whereby any channel being operated is detected thereby, preventing other channels from operating at the same time.

8 Claims, 3 Drawing Figures

SOLID STATE TOUCH CONTROL HAND SET CIRCUIT

BACKGROUND OF THE INVENTION

1. Field of the Invention

This invention relates to electrical control circuits, and more particularly to a new and improved solid state touch sensitive control circuit for selectively providing an output to a desired one of a plurality of loads.

2. Description of the Prior Art

Electrical control circuits as evidenced by the many teachings thereof to be found in the prior art have been employed previously in a variety of different applications. For example, one such application in which electrical control circuits have been heretofore known to be used is for controlling hospital bed adjusting power motors. U.S. Pat. No. 3,399,287, which issued on August 27, 1968 to G. M. Euler and which is assigned to the same assignee as the present application exemplifies one such use of an electrical control circuit. As employed by the patentee Euler, the electrical control circuit functions to control the operation of up to six different adjustments of a hospital bed, i.e., Head Up, Head Down, Foot Up, Foot Down, Bed Up, and Bed Down, and in such a manner as to prevent more than any one of these six possible bed adjustments from taking place at the same time.

Although the electrical control circuit taught by the patentee Euler has performed satisfactorily in service here-to-date, the desirability of providing a control circuit having certain features, which are not possessed by either the electrical control circuit taught by the patentee Euler, or by any other electrical control circuit known to exist in the prior art, has become evident recently. Thus for example there are known to exist certain situations wherein hospital beds are not provided with control units because of the nature of the treatment required by the patient occupying the bed. Also, there are situations wherein the patient occupying the hospital bed is physically incapacitated to a degree such that the patient is unable to apply the force necessary to operate the control unit to thereby initiate the desired functioning of the electrical control circuit. In addition, it is desirable that a control circuit be provided which is less susceptible, than prior art forms of electrical control circuits, to damage caused by the mechanical shock imparted to the control circuit components resulting from an accidental dropping or rough handling, by a bed-occupying patient, of the hand held control unit employed to initiate the functioning of the control circuit and thereby the desired adjustment of the patient's bed.

OBJECTS OF THE INVENTION

It is therefore an object of the present invention to provide a novel and improved control circuit wherein solid state circuit components having long electrical life are employed.

It is another object of the present invention to provide such a control circuit which by virtue of the use therein of solid state components is less likely to be rendered inoperative or be caused to malfunction as a result of mechanical shock imparted thereto.

It is a further object of the present invention to provide such a control circuit wherein solid state circuitry is employed to insure against sparking or arcing conditions.

Another object of the present invention is to provide such a control circuit operable on low voltage whereby accidental cutting of or severe damage to the circuit conductors cannot expose high voltage nor result in high power dissipation in the event of a short circuit.

A further object of the present invention is to provide such a control circuit wherein transmission of mechanical motion or force is not required for actuation of the circuit.

A still further object of the present invention is to provide such a control circuit which when employed as a hospital bed adjustment control circuit is compatible for use with the various types of motorized hospital beds presently available.

SUMMARY OF THE INVENTION

In carrying out the invention in one form, a solid state touch sensitive control circuit is provided which functions to selectively provide an output to a desired one of a plurality of loads while at the same time precluding the simultaneous transmission of an output to the remainder of the plurality of loads. The control circuit includes oscillator means connectable to a direct current source. The oscillator means functions to generate a continuous high frequency signal and to transmit this high frequency signal to a plurality of control channels. The number of control channels to be included in the control circuit is preferably selected to correspond to the number of loads to be controlled by the control circuit. These control channels are cascaded to comprise the complete control circuit.

Each of the plurality of control channels includes a first transistor having an emitter, a collector and a base, and a second transistor also having an emitter, a collector and a base. The first and second transistors are connected in circuit relationship such that the emitters thereof are connected together and such that the collector of the first transistor is connected through a diode to the base of the second transistor. In addition, the base of the first transistor has applied thereto the high frequency signal generated by the oscillator means and is also connected in circuit relationship with a touch sensitive switch means.

In operation, the second transistor is normally nonconducting thereby blocking the flow of power to the corresponding load. Upon actuation of the touch sensitive switch means, the supply of high frequency pulses being applied to the base of the first transistor which blocks conductivity of the second transistor is removed. When this occurs, the second transistor conducts and thereby supplies an output therefrom to the corresponding load connected in circuit relationship therewith.

The invention will be more fully understood from the following detailed description and its scope will be pointed out in the appended claims.

DESCRIPTION OF A PREFERRED EMBODIMENT

Figure 1:
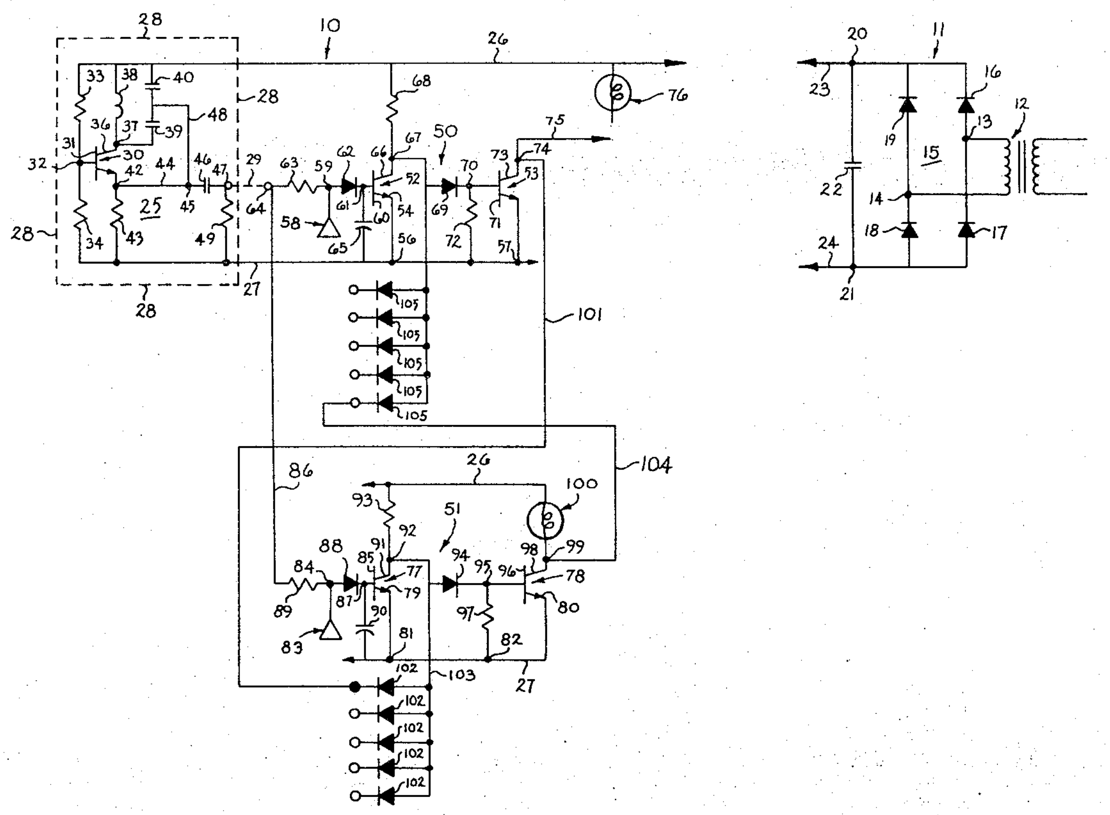
FIG. 1 is a schematic diagram of one form of a solid state touch sensitive control circuit in accordance with the present invention depicting two control channels thereof as well as the power supply therefor, and with portions broken away for purposes of clarity of illustration.

Referring now to the drawing, the invention as illustrated therein comprises a control circuit adapted to selectively provide an output to a desired one of a plurality of loads while inhibiting the simultaneous transmission of an output to any of the remainder of the plurality of loads. One form of control circuit in accordance with the present invention comprising a solid state touch sensitive control circuit, generally designated by reference numeral 10, is shown in FIG. 1 of the drawing. As depicted therein, the control circuit 10 is fed power from a low voltage, direct current power supply 11. The power supply 11 may, for example and as shown in the right hand portion of FIG. 1, comprise an isolated power limiting transformer winding 12 which is connected across the input terminals 13 and 14 of a full wave bridge rectifier 15. The full wave bridge rectifier 15 in turn comprises diodes 16, 17, 18 and 19, and further includes a pair of output terminals 20 and 21 across which capacitor 22 is connected. For purposes of clarity of illustration in the drawing, leads 23 and 24 connected to the output terminals 20 and 21, respectively, of full wave bridge rectifier 15 have not been illustrated as connected in circuit relationship to control circuit 10. However, the manner in which this circuit connection is accomplished will be described hereinafter. Thus it is seen that the control circuit 10 in accordance with the embodiment of the invention illustrated in FIG. 1 of the drawing is fed from a low voltage A.C. power source which is rectified and filtered to provide control circuit 10 with a D.C. power supply. It should however also be noted that other forms of a suitable D.C. power supply may be employed if so desired.

Referring further to FIG. 1 power from the power supply 11 passes through leads 23 and 24 and is supplied therefrom to oscillator means 25 through leads 26 and 27 to which, although not shown in the drawing in the interest of clarity of illustration, leads 23 and 24, respectively, are connected. An example of an oscillator means 25 which may be utilized in the control circuit 10 is depicted enclosed within the dash lines 28 in FIG. 1. Dash lines 28 are not to be confused with the dashed lead line 29 to which further reference will be made hereinafter.

Oscillator means 25 includes a transistor 30 which has its base 31 connected to junction 32 to which one end of each of a pair of series connected resistors 33 and 34 is connected. The other end of resistor 33 is connected to lead 26 and thereby to the positive terminal of the power supply source 11 while the other end of resistor 34 is connected to lead 27 and thereby to ground. The collector 36 of transistor 30 is connected through junction 37 to one end of inductor 38, the other end of which is connected to lead 26. Also, a pair of series connected capacitors 39 and 40 are connected between junction 37 and lead 26. The emitter 41 of transistor 30 is connected through junction 42 and resistor to lead 27. In addition, junction 42 is connected by lead 44 to junction 45, capacitor 46 and junction 47. Lead 48 connects the mid-point of capacitors 39 and 40 to junction 45 while junction 47 has one end of resistor 49 connected thereto with the other end of resistor 49 being connected to lead 27. As thus described, oscillator means 25 comprises a Colpitt circuit transistor oscillator which is supplied from power supply 11 and functions to generate a continuous high frequency signal.

The high frequency signal generated by oscillator means 25 is fed to each of a plurality of control channels. For purposes of description and illustration, solid state touch sensitive control circuit 10 as shown in FIG. 1 of the drawing includes a pair of control channels 50 and 51. It is to be understood, however, and it will become clear from the following description and a consideration of the embodiment of the invention shown in FIG. 3 of the drawing that the control circuit 10 may include a greater number of control channels than two.

Referring further to FIG. 1, control channel 50 includes a first transistor 52 and a second transistor 53 connected in circuit relationship such that the emitter 54 of transistor 52 and the emitter of transistor 53 are tied together. More specifically, the emitter 54 of transistor 52 is connected to junction 56 while the emitter 55 of transistor 53 is connected to junction 57 with lead 27 interconnecting junctions 56 and 57. A touch sensitive switch means 58 is connected through junction 59 to the base 60 of transistor 52. Touch sensitive switch means 58 may for example be of the type which includes one or more capacitive sensing electrodes suitably housed such as to be actuatable when touched. The base 60 of transistor 52 also has connected thereto, through junction 61, a diode 62 and a resistor 63, the latter being interconnected between the aforementioned junction 59, to which switch means 58 is connected, and junction 64. Capacitor 65 is connected between junction 61 and lead 27. Moreover, the collector 66 of transistor 52 is connected to lead 26 through junction 67 and resistor 68, and is also connected through diode 69 and junction 70 to the base 71 of transistor 53.

With further reference to the control channel 50, it is seen from FIG. 1 of the drawing that resistor 72 which has one end connected to lead 27 is connected through junction 70 to the base 71 of transistor 53. Also, the collector 73 of transistor 53 is connected through junction 74 to lead 75 which functions to provide the output signal from control channel 50. In accordance with the practice of one form of the invention, the output signal from control channel 50 is coupled to a power circuit control unit (not shown) through photo isolator means comprising an opto-electronic isolator including the lamp means 76 depicted in FIG. 1 of the drawing. The photo isolator means provides an energizable light source, i.e., lamp means 76, which is coupled optically to a light-sensitive transducer adapted to control operation of the power circuit control unit. Accordingly, power to energize the load (not shown) is thus fed from a power circuit control unit in response to an output signal being transmitted thereto from control channel 50. One embodiment of such a power circuit control unit comprises the subject matter of copending patent application, Ser. No. 177,787 filed on Sept. 3, 1971 and assigned to the same assignee as the present invention. Through the use of a photo isolator means electrical isolation is achieved between the control circuit 10 and the load (not shown) intended to be responsive thereto.

As noted hereinabove, the continuous high frequency signal generated by oscillator means 25 is fed to each of the control channels in the control circuit 10. In this connection, and for purposes of clarity of illustration, leads 26 and 27 have not been illustrated in FIG. 1 of the drawing as connected in circuit relationship with control channel 51. However, it is to be understood that the leads associated with control channel 51 which bear the identifying numerals 26 and 27 are continuations of the leads associated with oscillator means 25 and control channel 50 which bear these same reference numerals 26 and 27.

Proceeding now with a description of control channel 51, the latter is identical in construction to control channel 50. Thus, control channel 51 includes a first transistor 77 and a second transistor 78. The respective emitters 79 and 80 of the transistors 77 and 78 are interconnected through junctions 81 and 82 to lead 27. A touch sensitive switch means 83 is connected through junction 84 to the base 85 of transistor 7 by means of lead 86. The base 85 of transistor 77 also has connected thereto through junction 87 a diode 88 and a resistor 89. Resistor 89 is interconnected between junction 84 and junction 64, the latter having been referred to hereinabove in connection with the description of control channel 50. Referring to FIG. 1 of the drawing, it can be seen that lead 86 serves to couple in circuit relationship the base 60 of transistor 52 of control channel 50 with the base 85 of transistor 77 of control channel 51. In addition note is made of the fact that junction 64 is connected through lead 29 to oscillator means 25. The function of lead 29 which is illustrated in FIG. 1 in the form of a dash line will be more fully described subsequently.

Continuing with the description of control channel 51, capacitor 90 is connected between junction 87 and lead 27. The collector 91 of transistor 77 is connected through junction 92 and resistor 93 to lead 26. The collector 91 of transistor 77 is also connected through diode 94 and junction 95 to the base 96 of transistor 78. In addition, a resistor 97 is provided connected at one end to junction 95 and at the other end to lead 27. Finally, as depicted in FIG. 1 of the drawing, the collector 98 of transistor 78 is connected through junction 99 and lamp means 100 to lead 26. The lamp means 100 comprises a portion of an opto-electronic isolator which, when an output signal is provided from control channel 51, functions to transmit this output signal to the power circuit control unit (not shown) employed to feed power to the corresponding load (not shown) intended to be controlled by control channel 51, in the manner set forth hereinabove in connection with the description of control channel 50.

Turning next to a brief description of the mode of operation of the solid state touch control channel 10 of FIG. 1, a low voltage alternating current supply is rectified and filtered in power supply 11 to provide a direct current supply. Oscillator means 25 in the form of a Colpitt circuit transistor oscillator is connected by leads 23, 24 and 26, 27 to this direct current power supply. Oscillator means 25 generates a continuous high frequency signal. Through separate parallel circuits each with a series resistor connected in circuit relationship therewith this high frequency signal is transmitted through lead 29 and lead 86 to the input stage of each of control channels 50 and 51. Each control channel is associated with a corresponding one of a pair of loads (not shown). It is to be noted at this point, however, that if desired, and where the particular application of this invention may call for it, each channel could control operation of any number of loads, even though in hospital bed applications one ordinarily does not wish to do so. In the input stage the high frequency signal is amplified, rectified and filtered providing a direct current control signal in each control channel.

Normally the high frequency signal is transmitted to the input of each of control channels 50 and 51. That is, normally the first transistors, i.e., transistors 52 and 77 of control channels 50 and 51, respectively, are turned ON when the bases 60 and 85 of transistors 52 and 77, respectively, receive voltage from the oscillator means 25. However, when an external force is applied to either touch sensitive switch means 58 associated with transistor 52 or touch sensitive switch means 83 associated with transistor 77 the high frequency signal being supplied to the control channel 50 or the control channel 51 is shunted away from the input stage of the corresponding control channel. For purposes of description, assume that switch means 58 has been actuated. The consequent loss of the high frequency signal at the input stage of control channel 50 is the actuating signal. As soon as this occurs, the voltage disappears from the base 60 of transistor 52, the transistor 52 is turned OFF. Transistor 53 which has been turned OFF thereupon turns ON and drives the lamp means 76 which is opto coupled to control the power circuit control unit that drives the load (not shown) controlled by control channel 50. At the same time a signal is supplied to the logic circuitry associated with each of the control channels to inhibit the other control channel, i.e., control channel 51 from functioning. In this connection it will be noted with reference to FIG. 1 of the drawing that the collector 74 of transistor 53 is connected by lead 101 to one of five diodes 102 which in turn are connected by lead 103 through junction 92 to the collector 91 of transistor 77 of control channel 51. In similar fashion the collector 98 of transistor 78 of control channel 51 is connected through junction 99 and by lead 104 to one of five diodes 105 which are connected by lead 106 to junction 67 and thereby to the collector 66 of transistor 52 of control channel 50. Although not depicted in FIG. 1 of the drawing, the diodes 102 and 105 are connected in circuit relationship with the logic circuitry (not shown) associated with each of control channels 50 and 51 in a manner similar to that to be described subsequently in connection with the description of the circuitry illustrated in FIG. 2 of the drawing. At this point it is sufficient to note that the logic circuitry is arranged to permit a direct current output signal from only one of the control channels, i.e., from control channel 50 in accordance with the preceding example. The logic circuitry comprises conventional inhibit logic which allows one and only one control channel circuit to function at one time. Priority is based on first come, first served. When the external force is removed from touch sensitive switch means 58, the high frequency signal is restored to the input stage of control channel 50 and the direct current output control signal is turned OFF. Upon actuation once again of either switch means 58 or switch means 83, the above-described operation is repeated such as to provide an output signal from the control channel associated with the actuated switch means.

Figure 3:
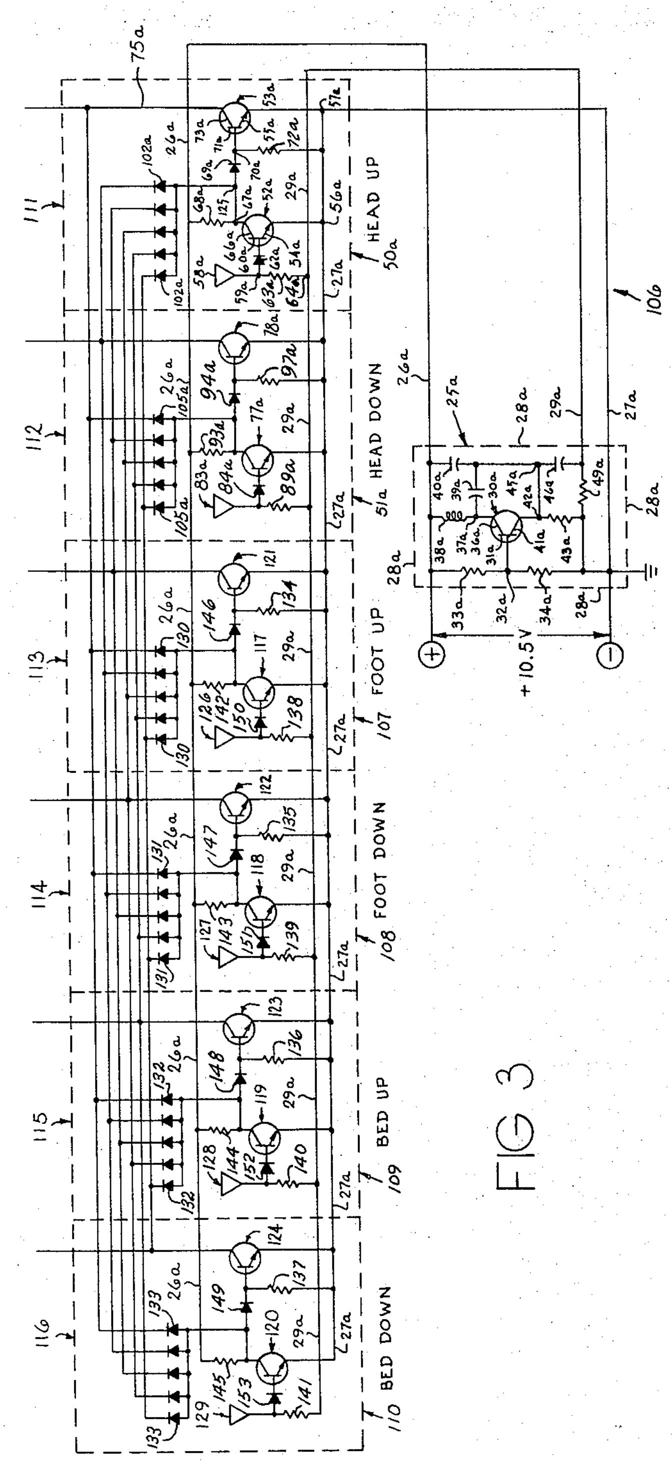
FIG. 3 is a schematic diagram of a solid state touch sensitive control circuit in accordance with the present invention in a form applicable for use as a hospital bed adjustment control circuit.

Inasmuch as the control circuit of the present invention is particularly adapted for use in a hospital bed touch control handset to control the power motors for adjusting a hospital bed, reference will now be had to FIG. 3 of the drawing wherein such an embodiment of the invention is depicted. FIG. 3 illustrates a solid state touch sensitive control circuit, generally designated by reference numeral 106 which is basically similar to the solid state touch sensitive control circuit 10 previously described and as illustrated in FIG. 1 of the drawing, except insofar as concerns the number of control channels included in the respective circuits. Thus, whereas solid state touch sensitive control circuit 10 as described and illustrated includes only two control channels, solid state touch sensitive control channel 106 as used to control the adjustments of a hospital bed includes six control channels, i.e., one for each of the six possible bed adjustments. The six basic hospital bed adjustments sought to be controlled are as follows: Head Up, Head Down, Foot Up, Foot Down, Bed Up and Bed Down. In view of the basic similarity between the solid state touch sensitive control circuit 106 of FIG. 3 and the solid state touch sensitive control circuit 10 of FIG. 1, and for purposes of ease of understanding of this similarity therebetween, the circuit components of control circuit 106 which find correspondence in the control circuit 10 of FIG. 1 have been identified in both FIGURES by the same reference numerals but with the addition of the letter *a* after the numerals appearing in FIG. 3.

As depicted in FIG. 3, control circuit 106 includes the oscillator means 25a which is illustrated enclosed within the dash lines 28a and which is fed from a suitable power supply (not shown). Power supply 11 illustrated in FIG. 1 of the drawing which was previously described hereinabove represents one example of a suitable power supply which may be employed to feed power to the control circuit 106. The power supply (not shown) is connectable to oscillator means 25a by means of leads 26a and 27a to provide a direct current power supply thereto.

Oscillator means 25a includes transistor 30a which has its base 31a connected to junction 32a to which one end of each of a pair of series connected resistors 33a and 34a are connected. The other end of resistor 33a is connected to lead 26a which is connectable to the positive terminal of the power supply. The other end of resistor 34a is connected to ground through lead 27a which is also connectable to the negative terminal of the power supply. The collector 36a of transistor 30a is connected through junction 37a to one end of inductor 38a, the other end of which is connected to lead 26a. A pair of capacitors 39a and 40a are connected between junction 37a and lead 26a. The emitter 41a of transistor 30a is connected through junction 42a and resistor 43a to lead 29a. In addition the mid-point between capacitors 39a and 40a is connected through junction 45a to capacitor 46a and therethrough to lead 29a. Finally, resistor 49a is provided connected in circuit with lead 29a. Thus, oscillator means 25a can be seen to comprise a Colpitt circuit transistor oscillator which functions to generate a continuous high frequency signal.

The high frequency signal generated by oscillator means 25a is fed by means of lead 29a to each of a plurality of control channels. Thus it is seen that oscillator means 25a comprises a common oscillator for each of the six control channels 50a, 51a, 107, 108, 109 and 110. The function of each of control channels 50a, 51a, 107, 108, 109 and 110 is to provide a means of exercising control over a corresponding one of the six possible adjustments, i.e., Head Up, Head Down, Foot Up, Foot Down, Bed Up and Bed Down, capable of being made to the hospital bed. For purposes of clarity of understanding, the circuit components for each of the control channels 50a, 51a, 107, 108, 109 and 110 are to be found located within the dash line enclosures 111, 112, 113, 114, 115 and 116, respectively.

Power is fed from the power supply (not shown) through leads 26a and 27a to each of the control channels 50a, 51a, 107, 108, 109 and 110 in such a manner that the first transistor, i.e., transistor 25a, 77a, 117, 118, 119 and 120 of each of the six control channels normally conducts while the second transistor thereof, i.e., transistors 53a, 78a, 121, 122, 123 and 124 is normally non-conducting. With reference to FIG. 3 of the drawing it can be seen that the circuitry for each of the six control channels 50a, 51a, 107, 108, 109 and 110 is substantially identical. Accordingly, it is believed sufficient if only the circuitry of control channel 50a is specifically described hereinafter, it being thus understood that the other control channels, i.e., control channels 51a, 107, 108, 109 and 110 are similarly constructed and function in similar fashion.

Referring thus to control channel 50a as depicted in FIG. 3 of the drawing, the respective emitters 54a and 55a of first and second transistors 52a and 53a thereof are tied together through junctions 56a and 57a, and lead 27a. The collector 66a of transistor 52a is connected through diode 69a and junctions 67a, 125 and 70a to the base 71a of transistor 53a. The collector 66a of transistor 52a is also connected through junction 67a and resistor 68a to lead 26a. Resistor 72a is connected to lead 27a and through junction 70a to the base 71a of transistor 53a. Control channel 50a further includes a touch sensitive switch means 58a which is connected through junction 59a and diode 62a to the base 60a of transistor 52a. Resistor 63a is connected in circuit between junction 64a and junction 59a. Likewise sets 105a, 130, 131, 132 and 133 of five diodes in respective channels 51a, 107, 108, 109 and 110 correspond to diode set 102a in channel 50a. Similarly resistors 97a, 134, 135, 136 and 137 in respective channels 51a, 107, 108, 109 and 110 corresponds to resistor 72a in channel 50a; resistors 89a, 138, 139, 140 and 141 in respective channels 51a, 107, 108, 109 and 110 corresponds to resistor 63a in channel 50a; resistors 93a, 142, 143, 144 and 145 in respective channels 51a, 107, 108, 109 and 110 corresonds to resistor 68a in channel 50a; diodes 94a, 146, 147, 148 and 149 in respective channels 51a, 107, 108, 109 and 110 corresponds to diode 69a in channel 50a; and diodes 84a, 150, 151, 152 and 153 in respective channels 51a, 107, 108, 109 and 110 corresponds to diode 62a in channel 50a.

Assume now that the circuit components of control circuit 106 are encased in a hospital bed touch control hand set of the type having a physical size and configuration similar to that illustrated in U.S. Pat. No. 3,399,287. Further assume that a motorized hospital bed has been provided with such a hand set and that the patient occupying the bed desires to raise the head of the hospital bed. The patient would thus place a finger on the portion of the hand set bearing the legend HEAD UP. This is sufficient to actuate touch sensitive switch means 58*a* which in accordance with one form of the invention may comprise one of a plurality of six thin metal discs mounted in two rows on the back side of the face plate of the hand set case. In this form of the invention these six discs comprise capacitive sensing electrodes each of which is electrically connected to the high frequency signal input terminal of one of the six control channels 50*a*, 51*a*, 107, 108, 109 and 110.

Normally the high frequency signal is transmitted to the inputs of all of the six control channels 50*a*, 51*a*, 107, 108, 109 and 110. However, when the patient places a finger tip on the legend HEAD UP on the face plate of the hand set directly over the disc electrode included in touch sensitive switch means 58*a*, the capacitive coupling to the patient's body shunts the high frequency signal away from the input stage of control channel 50*a*. The series resistor 63*a* in the high frequency signal circuit limits the current preventing overloading of oscillator means 25*a*. This loss of high frequency at the input stage of control channel 50a is the actuating signal and results in a direct current output control signal being fed from collector 73*a* of transistor 53*a* to lead 75*a*. More specifically, transistor 52*a* of control channel 50*a* is normally turned ON when the base 60*a* thereof receives voltage from the oscillator means 25. As soon as this voltage disappears from the base 60*a* thereof which occurs as the result of switch means 58*a* having been actuated, transistor 52*a* is turned OFF. In response to transistor 52*a* being turned OFF, transistor 53*a* which has been non-conducting is turned ON and provides an output signal therefrom. This output signal may be employed, as was described previously hereinabove in connection with the description of the control circuit 10 to drive a photo isolator means comprising an opto-electronic isolator including a lamp means (not shown) which is opto coupled to a power circuit control unit that drives a motor load to raise the hospital bed. Such a power circuit control unit may take the form of that described in the aforereferenced copending patent application Ser. No. 117,787. When the height of the head portion of the hospital bed has been raised to the extent desired by the patient, removal of the patient's finger tip from the portion of the hand set bearing the legend HEAD UP will enable the high frequency signal to be restored to the input stage of control channel 50*a*. This causes transistor 52*a* to turn ON whereupon transistor 53*a* is turned OFF and the direct current output control signal from control channel 50*a* likewise terminates. In similar fashion by actuating one of the other touch sensitive switch means, i.e., touch sensitive means 83*a*, 126, 127, 128 or 129 of control channels 51*a*, 107, 108, 109 and 110, respectively, the hospital bed may be adjusted such as to lower the head of the bed, raise or lower the foot of the bed, or raise or lower the entire bed.

Normally the raising or lowering of the bed, foot or entire bed is accomplished by means of a series of three motors with one motor being provided to accomplish the adjustment of the head of the bed, a second for adjustment of the foot of the bed, and the third to accomplish adjustment in the height of the entire bed. Actuating the appropriate motor such as to cause the latter to rotate in a first direction causes the corresponding portion of the bed to move in an upward direction while rotation of the motor in the reverse direction results in the movement of the corresponding bed portion in a downward direction. It is thus readily apparent that damage could be done to a motor if the latter were to simultaneously receive conflicting signals directing the motor to rotate in opposite directions. Similarly the possibility of damage to the hospital bed exists if different portions of the bed are caused to move at the same time in either the same direction or in opposite directions. Accordingly, the control circuit 106 is connectable to logic circuitry which prevents all but one of the control channels from providing an output signal at any given time. Thus, referring to control channel 50*a*, a series of five diodes 102*a* are interconnected through junction 125 in circuit relationship with the collector 66*a* of transistor 52a and the base 71*a* of transistor 53*a*. The diodes 102*a* in turn are connected in circuit with similar series of five diodes associated with each of the other five control channels of control circuit 106. In addition the output signal which is provided when the second transistor of one of the control channels is turned ON also supplies the signal to prevent the other channels from functioning. Thus, for example in the illustration previously described hereinabove wherein control channel 50a is providing an output signal through lead 75*a*, this signal is also fed to the other five control channels from lead 75*a* which it will be noted from FIG. 3 is connected in circuit relationship with the series of diodes associated with each of the other control channels.

Figure 2:
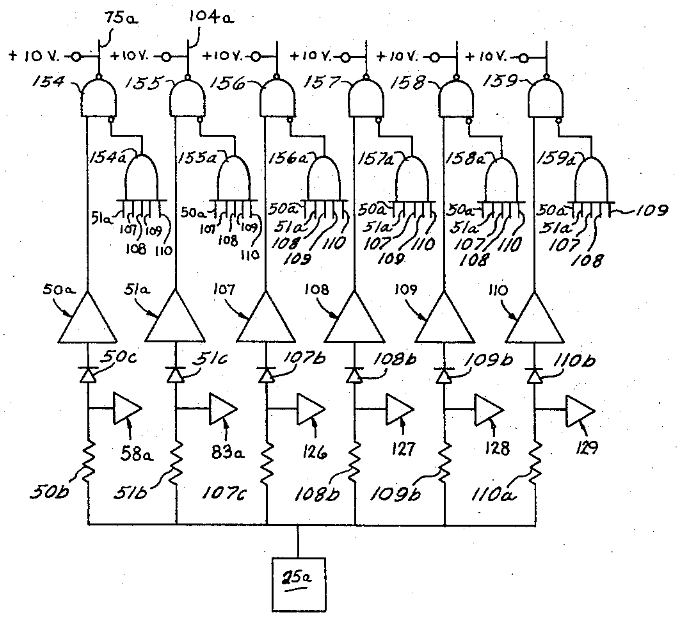
FIG. 2 is a schematic representation of the inhibit logic portion of a solid state touch sensitive control circuit in accordance with the present invention.

One form of conventional logic control circuitry which is employable in control circuit 106 to perform the aforedescribed inhibiting or disabling function is depicted schematically in FIG. 2 of the drawing. As shown in FIG. 2, oscillator means 25*a* transmits a continuous high frequency signal to the input stage of each of six control channels 50*a*, 51*a*, 107, 108, 109 and 110 via respective resistors 50*b*, 51*b*, 107*a*, 108*a*, 109*a* and 110*a*, and respective diodes 50*c*, 51*c*, 107*b*, 108*b*, 109*b* and 110b. In the input stages the high frequency signal is amplified, rectified and filtered. Upon actuation of a touch sensitive switch means such, as for example, switch means 58*a*, an output signal is established from control channel 50*a* is the manner described in the preceding paragraphs. This output signal which is supplied to a power circuit control unit is also supplied through conventional logic inhibit control circuitry to each of the other five control channels to prevent the simultaneous functioning of any of these other control channels. More specifically, the output of control channels 50*a*, 51*a*, 107, 108, 109 and 110 are respectively electrically connected to an input of respective inhibitor gates 154, 155, 156, 157, 158 and 159, while the output of control channel 50*a* is electrically connected to an output of gates 155*a*, 156*a*, 157*a*, 158*a* and 159*a* for respective channels 51*a*, 107, 108, 109 and 110; the output of control channel 51*a* is electrically connected to an input of gates 154*a*, 156*a*, 157*a*, 158*a* and 159*a* for respective channels 50*a*, 107, 108, 109 and 110; the output of control channel 107 is electrically connected an input of gates 154*a*, 155*a*, 157*a*, 158*a* and 159*a* for respective channels 50*a*, 51*a*, 108, 109 and 110; the output of control channel 108 is electrically connected to an input of gates 154*a*, 155*a*, 156*a*, 158*a* and 159*a* for respective channels 50*a* , 51*a*, 107, 109 and 110; the output of control channel 109 is electrically connected to an input of gates 154*a*, 155*a*, 156*a*, 157*a* and 159*a* for respective channels 50*a*, 51*a*, 107, 108 and 110; and the output of control channel 110 is electrically connected to an input of gates 154*a*, 155*a*, 156*a*,

157*a* and 158*a*. The output of gates 154*a*, 155*a*, 156*a*, 157*a*, and 159*a* is electrically connected to a control input terminal of respective inhibitor gates 154, 155, 156, 157, 158 and 159 so that if, for instance, control channel 50*a* is activated, a signal will be received at gates 155*a*, 156*a*, 157*a*, 158*a* and 159*a* which causes an inhibit signal to appear at the control input terminals of inhibitor gates 155, 156, 157, 158 and 159 to prevent an output from respective control channels 51*a*, 107, 108, 109 and 110 from passing therethrough while control channel 50a is still activated.

In accordance with one embodiment of the control circuit of the present invention upon which tests were run, the voltage supply applied thereto had a value of 10V. D.C. When the lamp means connected in circuit relationship with the output signal was ON, the voltage dropped down to 8V. Ripple on the D.C. was also found to be quite large, i.e., approximately 0.4V with 250 mfd in the circuit. For purposes of these tests an oscillator frequency of 300 to 400 KHZ was used but a wide range of other frequencies could be chosen. Deviations in the oscillator frequency would not affect the control performance.

Thus, in accordance with the present invention there has been provided a novel and improved solid state touch sensitive control circuit for selectively providing an output signal to a desired one of a plurality of loads, and having features especially desirable for the application thereof in a hand held pilot control unit for controlling hospital bed adjusting power motors. The all solid state circuitry of the subject control circuit of the present invention is not subject to sparking or arcing of parts. In addition for use in a hospital bed pilot control unit the circuit components of the subject control circuit are compatible with prior art forms of hospital bed touch control hand sets and hospital bed power circuit control units. That is, the circuit components of the subject control circuit are all mountable within the case of a tightly closed plastic hand set of the type shown in U.S. Pat. No. 3,399,287 to which, as known to those skilled in the art, may be attached a rugged plastic jacketed cable which in turn is connectable to a power circuit control unit assembly and thereby to the controlled motor loads. The aforementioned cable serves as a means of carrying the low voltage 60 cycle power supply to the hand set and the low voltage D.C. control signals from the hand set to the power circuit control unit assembly. In the power circuit control unit assembly these cable circuits are all isolated in a manner known to those skilled in the art from the higher voltage power circuits. The low voltage power supply source may as suggested hereinabove take the form of an isolated power limiting transformer winding, and the D.C. output control circuits, also as suggested previously, may be coupled to the power circuit control unit through opto-electronic isolators. By virtue of such an arrangement, cutting or severe damage to the cable cannot expose high voltage nor result in high power dissipation in a short circuit. Further, the solid state circuit components of the control circuit in accordance with the present invention have indefinitely long electrical life and are not affected by mechanical shock such as would result from accidental dropping or rough handling of the pilot control unit housing the aforementioned circuit components. Finally transmission of mechanical motion or force to the solid state touch sensitive control circuit is not required for actuation thereof, for as described hereinabove actuation of the solid state touch sensitive control circuit of the present invention may be initiated by the touch of a finger tip to discrete spots on the electrical insulating face plate of the casing within which the control circuit is housed.

While only two embodiments of our invention have been shown, it will be appreciated that modifications thereof may readily be made therein by those skilled in the art. For example other forms of touch sensitive switch means may be employed to initiate actuation of the control circuit, and/or other forms of oscillator means capable of transmitting a continuous high frequency signal may be utilized in the subject control circuit. In addition the output control signal may be fed to the load desired to be controlled by other means than an opto-electronic isolator connected in circuit relationship with a power circuit control unit. Also, the invention is not limited to a solid state touch sensitive control circuit having either two or six control channels, but can be extended to such a control circuit having as many control channels as required. The only limitation in this regard is the driving power of the output state. We therefore intend by the appended claims to cover all such modifications which fall within the true spirit and scope of our invention.

What we claim as new and desire to secure by Letters Patent of the United States is:

1. A solid state control circuit comprising:

a. means for providing a direct current power supply;

b. oscillator means connected to said direct current power supply for generating a high frequency signal;

c. at least a pair of control channel means connected in circuit relationship with said oscillator means to receive said high frequency signal therefrom, said pair of control channel means each capable of selectively providing an output signal therefrom;

d. each of said pair of control channel means including first and second semiconductor switching means connected in circuit relationship, said first and said second semiconductor switching means of each of said pair of control channel means having a first condition and a second condition wherein when said first semiconductor switching means of one of said pair of control channel means is in said first condition said second semiconductor switching means of said one of said pair of control channel means is in said second condition and when said first semiconductor switching means of said one of said pair of control channel means is in said second condition said second semiconductor switching means of said one of said pair of control channel means is in said first condition;

e. each of said pair of control channel means further including manual switch means connected in circuit relationship with said first and said second semiconductor switching means of the corresponding one of said pair of control channel means such that when said manual switch means of one of said pair of control channel means is actuated said first semi-conductor switching of said one of said pair of control channel means is caused to change from said first condition to said second condition thereby causing said second semiconductor switching means of said one of said pair of control channel means to change from said second condition to said first condition to thereby cause an output signal to be provided from said one of said pair of control channel means; and f. means connected in circuit relationship with said control channel means for preventing other output signals from the remaining of said control channel means from being simultaneously generated with the output signal from said one of said control channel means.

2. A solid state control circuit as set forth in claim 1 wherein:

a. said oscillator means comprises a Colpitt circuit transistor oscillator for generating a continuous high frequency signal;

b. said first condition comprises the ON condition of said first and second semiconductor switching means of each of said pair of control channel means; and c. said second condition comprises the OFF condition of said first and said second semiconductor switching means of each of said pair of control channel means.

3. A solid state control circuit as set forth in claim 1 wherein:

a. said first semiconductor switching means of each of said pair of control channel means includes a first transistor having a base, a collector and an emitter;

b. said second semiconductor switching means of each of said pair of control channel means includes a second transistor having a base, a collector and an emitter;

c. said emitter of said first transistor is coupled in circuit relationship to said emitter of said second transistor; and d. said collector of said first transistor is connected in circuit relationship to said base of said second transistor.

4. A solid state control circuit as set forth in claim 3 wherein:

a. said manual switch means of the corresponding one of said pair of control channel means is connected in circuit relationship to said base of said first transistor;

b. said output signal is provided from said collector of said second transistor; and c. said preventing means is connected in circuit relationship to said collector of said first transistor of said first semiconductor switching means of each of said pair of control channel means.

5. A solid state control circuit as set forth in claim 4 wherein said preventing means comprises an inhibit logic circuit.

6. A solid state control circuit as set forth in claim 1 further comprising:

a. lamp means connected in circuit relationship to said collector of a corresponding one of said second transistors of said plurality of control channels, said lamp means being energized in response to an output signal being provided from said corresponding one of said second transistors.

7. A solid state touch sensitive hospital bed control handset for selectively providing a pilot signal to initiate operation of a corresponding one of a plurality of power motors for making desired adjustments to a hospital bed, comprising:

a. a plurality of control channels corresponding in number to at least the number of bed adjustment functions desired to be controlled, each of said plurality of control channels being capable of selectively providing a pilot signal therefrom, said plurality of control channels each including a first transistor, a second transistor, and a touch sensitive switch means;

b. said first transistor having a first condition and a second condition and including a base, a collector and an emitter, said second transistor having a first condition and a second condition and including a base, a collector and an emitter, said emitter of said first transistor being coupled to said emitter of said second transistor and said collector of said first transistor being connected to said base of said second transistor to connect said first transistor in circuit relationship with said second transistor such that when said first transistor is in said first condition said second transistor is in said second condition and when said first transistor is in said second condition said second transistor is in said first condition;

c. oscillator means for generating a high frequency signal, said oscillator means being connected to said base of said first transistor for providing thereto said high frequency signal to cause said first transistor to be in said first condition and said second transistor to be in said second condition;

d. said touch sensitive switch means being connected in circuit relationship with said first transistor and said second transistor, said touch sensitive switch means being actuatable to cause interruption of the application of said high frequency signal from said oscillator means to said first transistor to cause said first transistor to move to said second condition thereby causing said second transistor to move to said first condition to thereby generate a pilot signal from one of said plurality of control channels; and e. inhibit means for preventing other pilot signals from the remainder of said plurality of control channels from being generated while the pilot signal from said one of said plurality of said control channels is still being generated, said inhibit means comprising an inhibit logic circuit connected in circuit relationship from said collector of the second transistor of each one of said control channels to said collector of said first transistor of each of the remainder of said control channels.

8. A solid state touch sensitive control circuit as set forth in claim 7 wherein:

a. said oscillator means comprises a Colpitt circuit transistor oscillator for generating a continuous high frequency signal;

b. said first condition comprises the ON condition of said first and second transistors; and c. said second condition comprises the OFF condition of said first and second transistors.

* * * * *